(12) United States Patent
Lou et al.

(10) Patent No.: US 9,196,064 B2
(45) Date of Patent: Nov. 24, 2015

(54) IMAGE RECONSTRUCTION METHOD AND DEVICE FOR TILTED HELICAL SCAN

(71) Applicant: Shenyang Neusoft Medical Systems Co., Ltd., Shenyang (CN)

(72) Inventors: Shanshan Lou, Shenyang (CN); Jiangwei Zhao, Shenyang (CN)

(73) Assignee: SHENYANG NEUSOFT MEDICAL SYSTEMS CO., LTD., Shenyang (CN)

( * ) Notice: Subject to any disclaimer, the term of this patent is extended or adjusted under 35 U.S.C. 154(b) by 67 days.

(21) Appl. No.: 14/142,957

(22) Filed: Dec. 30, 2013

(65) Prior Publication Data

US 2015/0071515 A1   Mar. 12, 2015

(30) Foreign Application Priority Data

Sep. 6, 2013 (CN) .......................... 2013 1 0407927

(51) Int. Cl.
| | |
|---|---|
| G06K 9/00 | (2006.01) |
| G06T 11/00 | (2006.01) |
| G06K 9/46 | (2006.01) |

(52) U.S. Cl.
CPC ............... *G06T 11/008* (2013.01); *G06K 9/46* (2013.01)

(58) Field of Classification Search
None
See application file for complete search history.

(56) References Cited

U.S. PATENT DOCUMENTS

| | | | | |
|---|---|---|---|---|
| 5,315,665 A | * | 5/1994 | Ohhashi ........................ | 382/131 |
| 5,625,660 A | * | 4/1997 | Tuy ................................ | 378/15 |
| 5,802,134 A | * | 9/1998 | Larson et al. ..................... | 378/4 |
| 6,173,032 B1 | * | 1/2001 | Besson ........................... | 378/19 |
| 6,256,366 B1 | * | 7/2001 | Lai .................................... | 378/4 |
| 6,490,334 B1 | | 12/2002 | Wang et al. | |
| 6,865,247 B2 | * | 3/2005 | Hagiwara ........................ | 378/4 |
| 7,215,734 B2 | * | 5/2007 | Hsieh et al. ..................... | 378/19 |
| 7,580,501 B2 | * | 8/2009 | Hagiwara et al. .............. | 378/19 |
| 8,023,713 B2 | * | 9/2011 | Zamyatin et al. ............. | 382/131 |
| 2006/0002507 A1 | * | 1/2006 | Hsieh et al. ..................... | 378/19 |
| 2008/0044069 A1 | * | 2/2008 | DuGal .......................... | 382/128 |

FOREIGN PATENT DOCUMENTS

| | | |
|---|---|---|
| CN | 1403058 A | 3/2003 |
| CN | 1650809 A | 8/2005 |
| CN | 1705455 A | 12/2005 |
| CN | 102727230 A | 10/2012 |
| JP | 2007151668 A | 6/2007 |

OTHER PUBLICATIONS

Multi-slice helical CT:Scan and reconstruction, Hui Hu, Med. Phys. 26(1), Jan. 1999, pp. 5-18.*

* cited by examiner

*Primary Examiner* — Jayesh A Patel
(74) *Attorney, Agent, or Firm* — Kilpatrick Townsend & Stockton LLP

(57) ABSTRACT

Image reconstruction method and device for tilted helical scan are provided. The method includes: acquiring data generated by the tilted helical scan; calculating a ray channel parameter and a slice number corresponding to each pixel position based on a geometric relationship that a ray of the tilted helical scan emitting from a ray source to a detector intersects with a pixel; and performing image reconstruction by using a three-dimensional helical back-projection method based on the acquired data, and the ray channel parameter and the slice number corresponding to each pixel position. With the method and device, there is no need to correct the raw data, which ensures the accuracy of the data, and the artifact is avoided, which ensures the accuracy of the reconstructed image.

10 Claims, 1 Drawing Sheet

IMAGE RECONSTRUCTION METHOD AND DEVICE FOR TILTED HELICAL SCAN

This application claims the priority of Chinese Patent Application No. 201310407927.2, entitled "IMAGE RECONSTRUCTION METHOD AND DEVICE FOR TILTED HELICAL SCAN", filed with the Chinese State Intellectual Property Office on Sep. 6, 2013, the content of which is incorporated herein by reference in its entirety.

FIELD

The present disclosure relates to the field of medical image technology, and in particular to an image reconstruction method and a device for tilted helical scan.

BACKGROUND

X-ray computed tomography (CT) is a technology for reconstructing a cross section of a detected object by utilizing the computer technology, to obtain a tomographic image. In this technique, the ray that passes through the detected object is collected by a computer and an image is reconstructed by using a certain algorithm, based on different ray absorptivity and transmissivity for each portion of the detected object when the ray passes through the detected object.

There are many scanning modes for the existing CT devices. With the rotational speed, the spatial resolution and the width of the detection for the device being increased and the requirement on the radiation dose for scanning becoming strict, the tilted helical scan mode has been widely used due to the reduced radiation damage of the X-ray on certain special portions of a human body and the positive effect on the scan imaging for a curvilinear anatomical structure.

According to the geometrical structure of the tilted scan, the motion trajectory of the X-ray source relative to the object is a beveled helical structure. Therefore, artifacts may appear when reconstructing an image using a conventional helical reconstruction method. Generally, data correction, such as interpolation or smoothing, has to be performed before the image reconstruction. However, this data correction may contaminate the raw data in a certain degree, thereby affecting the quality of the final reconstructed image.

SUMMARY

In order to solve the above technical problem, an image reconstruction method and device for tilted helical scan is provided by embodiments of the disclosure, in which a channel angle and a slice number of a pixel point projected onto a detector at a certain angle are calculated and an image is reconstructed by using a three-dimensional helical back-projection method. With the method and the device, there is no need to correct the raw data and the artifact is avoided, therefore, the quality of the reconstructed image is ensured.

Following technical solutions are provided by embodiments of the disclosure.

An image reconstruction method for tilted helical scan includes:

acquiring data generated by the tilted helical scan;

calculating a ray channel parameter and a slice number corresponding to each pixel position based on a geometric relationship that a ray of the tilted helical scan emitting from a ray source to a detector intersects with a pixel; and performing image reconstruction by using a three-dimensional helical back-projection method based on the acquired data, and the ray channel parameter and the slice number corresponding to each pixel position.

Preferably, the calculating a ray channel parameter and a slice number corresponding to each pixel position based on a geometric relationship that a ray of the tilted helical scan emitting from a ray source to a detector intersects with a pixel includes:

establishing a ray source parametric mathematical equation, a tilted detector parametric mathematical equation and a target tilted image parametric mathematical equation for a tilted scan system;

calculating a ray equation for a ray from the ray source to a certain pixel position by using the target tilted image parametric mathematical equation and the ray source parametric mathematical equation; and solving the ray equation and the tilted detector parametric mathematical equation simultaneously for the ray channel parameter and the slice number, based on a geometric relationship that there is an intersection between the ray and the detector.

Preferably, the acquired data generated by the tilted helical scan is cone-beam data or wedge-beam data.

Preferably, in the case where the acquired data generated by the tilted helical scan is cone-beam data, the calculating a ray channel parameter and a slice number corresponding to each pixel position based on a geometric relationship that a ray of the tilted helical scan emitting from a ray source to a detector intersects with a pixel includes:

based on a geometric relationship of the tilted helical scan, establishing a following ray source helical trajectory parametric equation:

$$S(\theta) = \begin{cases} x_F = R\sin\theta \\ y_F = R\cos\theta\cos\varphi \\ z_F = \dfrac{H}{2\pi}\theta + R\cos\theta\sin\varphi \end{cases},$$

establishing a following tilted detector parametric equation:

$$D(\theta, \gamma, m) = \begin{cases} x_D = R\sin\theta - R_{FD}\sin(\theta - \gamma) \\ y_D = (R\cos\theta - R_{FD}\cos(\theta - \gamma))\cos\varphi - D(m - MidSlice)\sin\varphi \\ z_D = \dfrac{H}{2\pi}\theta + (R\cos\theta - R_{FD}\cos(\theta - \gamma))\sin\varphi + D(m - MidSlice)\cos\varphi \end{cases},$$

establishing a following target tilted image parametric equation (for a point (h,v) on an image):

$$\begin{cases} x_p = (v - Mid) * \Delta p + CenterX \\ y_p = ((Mid - h) * \Delta p + CenterY) * \cos\varphi \\ z_p = ((Mid - h) * \Delta p + CenterY) * \sin\varphi + Z_0 \end{cases},$$

where θ denotes a projection angle; φ denotes a tilted angle of the detector; R denotes a rotation radius; H denotes an absolute pitch; $Z_0$ denotes an horizon position for a target image; P*P denotes an image matrix; FOV denotes a field of view for imaging; for the point (h,v) on the image, $$Mid = \frac{P-1}{2},$$

and CenterX and CenterY denote a reconstruction center; $\Delta p$ denotes width of a single pixel; MidSlice denotes a center slice and has a value of $$\frac{M-1}{2},$$

where M is the total number of slices of two-dimensional detectors; $\gamma$ denotes a channel angle; and m denotes the slice number;

establishing a following ray equation for a ray from the ray source to a certain pixel position by using the target tilted image parametric equation and the ray source helical trajectory parametric equation:

$$\begin{cases} x = x_F + t(x_p - x_F) \\ y = y_F + t(y_p - y_F) \\ z = z_F + t(z_p - z_F) \end{cases}$$

where t denotes an intermediate parameter for calculating; and solving the ray equation and the tilted detector parametric equation for the channel angle, $\gamma$, and the slice number, m, based on a geometric relationship that there is an intersection between the ray equation and the tilted detector parametric equation.

Preferably, in the case where the acquired data generated by the tilted helical scan is wedge-beam data, the calculating a ray channel parameter and a slice number corresponding to each pixel position based on a geometric relationship that a ray of the tilted helical scan emitting from a ray source to a detector intersects with a pixel includes:

based on a geometric relationship of the tilted helical scan, establishing a following ray source helical trajectory parametric equation:

$$S(\theta, T) = \begin{cases} x_F = R\sin\left(\theta + \arcsin\frac{T}{R}\right) \\ y_F = R\cos\left(\theta + \arcsin\frac{T}{R}\right)\cos\varphi \\ z_F = \frac{H}{2\pi}\left(\theta + \arcsin\frac{T}{R}\right) + R\cos\left(\theta + \arcsin\frac{T}{R}\right)\sin\varphi \end{cases},$$

establishing a following tilted detector parametric equation:

$$D(\theta, \gamma, m) = \begin{cases} x_D = R\sin\left(\theta + \arcsin\frac{T}{R}\right) - R_{FD}\sin(\theta) \\ y_D = \left(R\cos\left(\theta + \arcsin\frac{T}{R}\right) - R_{FD}\cos(\theta)\right)\cos\varphi - D(m - MidSlice)\sin\varphi \\ z_D = \frac{H}{2\pi}\left(\theta + \arcsin\frac{T}{R}\right) + \left(R\cos\left(\theta + \arcsin\frac{T}{R}\right) - R_{FD}\cos(\theta)\right)\sin\varphi + D(m - MidSlice)\cos\varphi \end{cases},$$

establishing a following target image parametric equation:

$$\begin{cases} x_p = (v - Mid) * \Delta p + CenterX \\ y_p = ((Mid - h) * \Delta p + CenterY) * \cos\varphi \\ z_p = ((Mid - h) * \Delta p + CenterY) * \sin\varphi + Z_0 \end{cases},$$

where $\theta$ denotes a projection angle; $\varphi$ denotes a tilted angle of the detector; R denotes a rotation radius; H denotes an absolute pitch; $Z_0$ denotes an imaging position for a target image; P*P denotes an image matrix; FOV denotes a field of view for imaging; for a point (h,v) on an image, $$Mid = \frac{P-1}{2},$$

and CenterX and CenterY denote a reconstruction center; $\Delta p$ denotes width of a single pixel; MidSlice denotes a center slice and has a value of $$\frac{M-1}{2},$$

where M is the total number of slices of two-dimensional detectors; T denotes a vertical distance between a central channel and a ray projected onto a center plane; and m denotes the slice number;

establishing a following ray equation for a ray from the ray source to a certain pixel position by using the target image parametric equation and the ray source helical trajectory parametric equation:

$$\begin{cases} x = x_F + t(x_D - x_F) \\ y = y_F + t(y_D - y_F) \\ z = z_F + t(z_D - z_F) \end{cases};$$

and solving the ray equation and the tilted detector parametric equation for the channel distance, T, and the slice number, m, based on a geometric relationship that there is an intersection between the ray equation and the tilted detector parametric equation.

An image reconstruction device for tilted helical scan is further provided according to the disclosure, including:

an acquiring unit, adapted to acquire data generated by the tilted helical scan;

a calculating unit, adapted to calculate a ray channel parameter and a slice number corresponding to each pixel position based on a geometric relationship that a ray of the tilted helical scan emitting from a ray source to a detector intersects with a pixel; and a reconstruction unit, adapted to perform image reconstruction by using a three-dimensional helical back-projection method based on the acquired data, and the ray channel parameter and the slice number corresponding to each pixel position.

Preferably, the calculating unit includes:

an establishing module, adapted to establish a ray source parametric mathematical equation, a tilted detector parametric mathematical equation and a target tilted image parametric mathematical equation for a scan system;

a calculating module, adapted to calculate a ray equation for a ray from the ray source to a certain pixel position by using the target tilted image parametric mathematical equation and the ray source parametric mathematical equation; and a solving module, adapted to solve the ray equation and the tilted detector parametric mathematical equation simultaneously for the ray channel parameter and the slice number, based on a geometric relationship that there is an intersection between the ray and the detector.

Preferably, the data generated by the tilted helical scan acquired by the acquiring unit is cone-beam data or wedge-beam data.

Preferably, in the case where the data generated by the tilted helical scan acquired by the acquiring unit is cone-beam data, the calculating unit includes:

a first establishing module, adapted to, based on a geometric relationship of the tilted helical scan, establish a following ray source helical trajectory parameter equation:

$$S(\theta) = \begin{cases} x_F = R\sin\theta \\ y_F = R\cos\theta\cos\varphi \\ z_F = \dfrac{H}{2\pi}\theta + R\cos\theta\sin\varphi \end{cases},$$

establish a following tilted detector parametric equation:

$$D(\theta, \gamma, m) = \begin{cases} x_D = R\sin\theta - R_{FD}\sin(\theta - \gamma) \\ y_D = (R\cos\theta - R_{FD}\cos(\theta - \gamma))\cos\varphi - D(m - MidSlice)\sin\varphi \\ z_D = \dfrac{H}{2\pi}\theta + (R\cos\theta - R_{FD}\cos(\theta - \gamma))\sin\varphi + D(m - MidSlice)\cos\varphi \end{cases},$$

establish a following target image parametric equation:

$$\begin{cases} x_p = (v - Mid) * \Delta p + CenterX \\ y_p = ((Mid - h) * \Delta p + CenterY) * \cos\varphi \\ z_p = ((Mid - h) * \Delta p + CenterY) * \sin\varphi + Z_0 \end{cases},$$

where $\theta$ denotes a projection angle; $\varphi$ denotes a tilted angle of the detector; R denotes a rotation radius; H denotes an absolute pitch; $Z_0$ denotes an imaging position for a target image; P*P denotes an image matrix; FOV denotes a field of view for imaging; for a point (h,v) on an image, $$Mid = \dfrac{P-1}{2},$$

and CenterX and CenterY denote a reconstruction center; $\Delta p$ denotes width of a single pixel; MidSlice denotes a center slice and has a value of $$\dfrac{M-1}{2},$$

where M is the total number of slices of two-dimensional detectors; $\gamma$ denotes a channel angle; and m denotes the slice number, and establish a following ray equation for a ray from the ray source to a certain pixel position by using the target image parametric equation and the ray source helical trajectory parametric equation:

$$\begin{cases} x = x_F + t(x_p - x_F) \\ y = y_F + t(y_p - y_F) \\ z = z_F + t(z_p - z_F) \end{cases},$$

where t denotes an intermediate parameter for calculating; and a first solving module, adapted to solve the ray equation and the tilted detector parametric equation for the channel angle, $\gamma$, and the slice number, m, based on a geometric relationship that there is an intersection between the ray equation and the tilted detector parametric equation.

Preferably, in the case where the data generated by the tilted helical scan acquired by the acquiring unit is wedge-beam data, the calculating unit includes:

a second establishing module, adapted to, based on a geometric relationship of the tilted helical scan, establish a following ray source helical trajectory parametric equation:

$$S(\theta, T) = \begin{cases} x_F = R\sin\left(\theta + \arcsin\dfrac{T}{R}\right) \\ y_F = R\cos\left(\theta + \arcsin\dfrac{T}{R}\right)\cos\varphi \\ z_F = \dfrac{H}{2\pi}\left(\theta + \arcsin\dfrac{T}{R}\right) + R\cos\left(\theta + \arcsin\dfrac{T}{R}\right)\sin\varphi \end{cases},$$

establish a following tilted detector parametric equation:

$$D(\theta, \gamma, m) = \begin{cases} x_D = R\sin\left(\theta + \arcsin\frac{T}{R}\right) - R_{FD}\sin(\theta) \\ y_D = \left(R\cos\left(\theta + \arcsin\frac{T}{R}\right) - R_{FD}\cos(\theta)\right)\cos\varphi - D(m - MidSlice)\sin\varphi \\ z_D = \frac{H}{2\pi}\left(\theta + \arcsin\frac{T}{R}\right) + \left(R\cos\left(\theta + \arcsin\frac{T}{R}\right) - R_{FD}\cos(\theta)\right)\sin\varphi + D(m - MidSlice)\cos\varphi \end{cases},$$

establish a following target image parametric equation;

$$\begin{cases} x_P = (v - Mid) * \Delta p + CenterX \\ y_P = ((Mid - h) * \Delta p + CenterY) * \cos\varphi \\ z_P = ((Mid - h) * \Delta p + CenterY) * \sin\varphi + Z_0 \end{cases},$$

where, θ denotes a projection angle; φ denotes a tilted angle of the detector; R denotes a rotation radius; H denotes an absolute pitch; $Z_0$ denotes an imaging position for a target image; P*P denotes an image matrix; FOV denotes a field of view for imaging; for a point (h,v) on an image, $$Mid = \frac{P-1}{2},$$

and CenterX and CenterY denote a reconstruction center; Δp denotes width of a single pixel; MidSlice denotes a center slice and has a value of $$\frac{M-1}{2},$$

where M is the total number of slices of two-dimensional detectors; T denotes a vertical distance between a central channel and a ray projected onto a center plane; and m denotes the slice number; and establish a following ray equation for a ray from the ray source to a certain pixel position by using the target image parametric equation and the ray source helical trajectory parametric equation:

$$\begin{cases} x = x_F + t(x_D - x_F) \\ y = y_F + t(y_D - y_F) \\ z = z_F + t(z_D - z_F) \end{cases}$$

and a second solving module, adapted to solve the ray equation and the tilted detector parametric equation for the channel distance, T, and the slice number, m, based on a geometric relationship that there is an intersection between the ray equation and the tilted detector parametric equation.

As can be seen from the above embodiments, in the image reconstruction method and device according to the disclosure, the data generated by the tilted helical scan is acquired; the ray channel parameter and the slice number corresponding to each pixel position are calculated based on the geometric mathematical relationship that there is an intersection between the ray of the tilted helical scan and the detector; and the image reconstruction is performed by using a three-dimensional helical back-projection method based on the acquired data, and the ray channel angle and the slice number corresponding to each pixel position. In this way, only the ray channel parameter and the slice number corresponding to each pixel position need to be calculated, and then the back-projection image reconstruction may be implemented by using the actual position mathematical relationship between the ray and the detector and the calculated actual ray channel parameter and slice number. Therefore, the artifact, which is caused by the channel and slice deviation view by view due to the tilted scanning plane, is avoided. Moreover, with the method and device, there is no need to correct the raw data, therefore, the accuracy of the data and the accuracy of the reconstructed image are ensured.

BRIEF DESCRIPTION OF THE DRAWINGS

In order to describe technical solutions of embodiments of the present disclosure or the prior art more clearly, drawings to be used in the description of the embodiments or the prior art are described briefly below. Apparently, the drawings described below are only some embodiments of the disclosure. Those skilled in the art may obtain other drawings from these drawings without any creative work.

DETAILED DESCRIPTION

To make the above object, features and advantages of the disclosure easy to be understood, embodiments of the disclosure are described in detail below in conjunction with the drawings.

It should be noted that the method according to the present disclosure can be used in an X-ray CT device. Generally, a CT device includes a scan bed, a work bench, a ray source and a detector. In the scanning, a detected object is firstly placed onto the patient couch; then the couch stretches from the work bench and delivers the detected object to a scan plane formed by the ray source and the detector; the ray source and the detector rotate around the detected object to obtain related scanning data of the detected object; and finally corresponding images are reconstructed based on the related scanning data. The obtained images can reflect the actual conditions of the detected object.

First Embodiment

Figure 1:
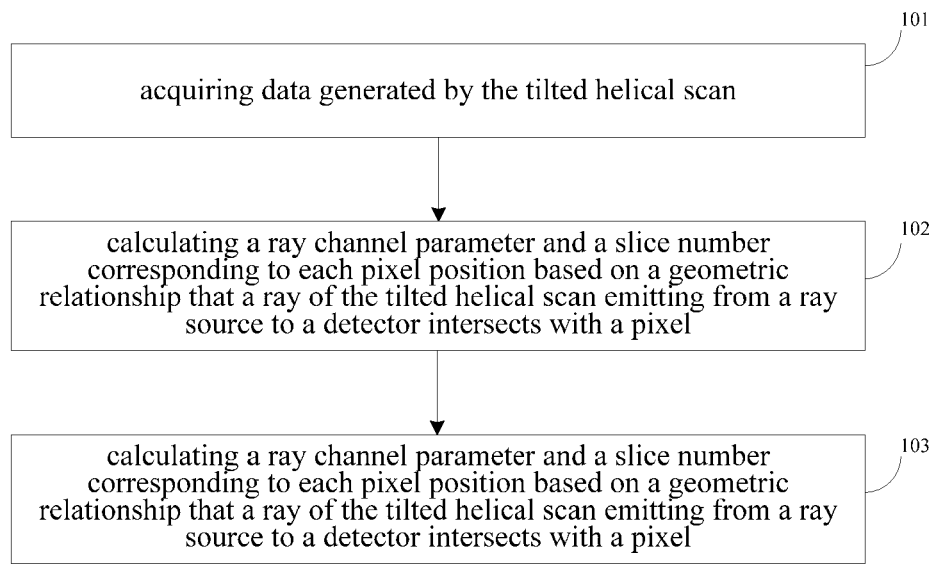
FIG. 1 is a flow chart of an image reconstruction method for tilted helical scan according to a first embodiment of the disclosure.

Reference is made to FIG. 1 which is a flow chart of an image reconstruction method for tilted helical scan according to a first embodiment of the disclosure. The method includes the following steps.

Step 101 is, acquiring data generated by the tilted helical scan.

Preferably, the data generated by the tilted helical scan is cone-beam data or wedge-beam data. The cone-beam data is pre-corrected data obtained by the tilted helical scan performed by the CT device. The wedge-beam data is data obtained by performing the well known parallel beam rebine (or the wedge beam rebine) on the pre-corrected data obtained by the tilted helical scan performed by the CT device, to facility the back-projection. After rebine, data at each angle includes a series of ray clusters. Each of the clusters includes M rays (M is the slice number of the detector) whose projections onto the X-Y plan are superposed. Moreover, the projections of the clusters are parallel to each other. The number of the ray clusters at each angle is the same as the number of the channels of the detector.

Step 102 is, calculating a ray channel parameter and a slice number corresponding to each pixel position based on a geometric relationship that a ray of the tilted helical scan emitting from a ray source to a detector intersects with a pixel.

Preferably, Step 102 may be implemented by:

establishing a ray source parameter mathematical equation, a tilted detector parameter mathematical equation and a target tilted image parameter mathematical equation for a scan system;

calculating a ray equation for a ray from a ray source to a certain pixel position by using the target tilted image parameter mathematical equation and the ray source parameter mathematical equation; and solving the ray equation and the detector parameter equation simultaneously for the ray channel parameter and the slice number, based on a geometric relationship that there is an intersection between the ray and the detector.

Preferably, ramp-like convolution kernel is used in the three-dimensional helical back-projection method.

Preferably, different helical weighting is used in the three-dimensional helical back-projection method according to different type of the data generated by the tilted helical scan.

In the case where the acquired data generated by the tilted helical scan is the cone-beam data, different parker window helical weightings are preferably used in the three-dimensional helical back-projection method. In the case where the acquired data generated by the tilted helical scan is the wedge-beam data, trapezoidal helical weightings or Aperture helical weightings are preferably used in the three-dimensional helical back-projection method.

Since the cone-beam data and the wedge-beam data have different characteristics, the type of the helical weighting actually used may differ. However, there are various types of helical weightings. The above-mentioned helical weightings are only examples and the disclosure is not limited thereto.

Step 103 is, performing image reconstruction by using the three-dimensional helical back-projection method based on the acquired data, and the ray channel parameter and the slice number corresponding to each pixel position.

The image reconstruction is performed by using the existing three-dimensional helical back-projection method, in which the ray channel angle and the slice number are parameters obtained from above Step 102.

As can be seen from the first embodiment described above, in the image reconstruction method according to the disclosure, the data generated by the tilted helical scan is acquired; the ray channel angle and the slice number corresponding to each pixel position are calculated based on the mathematical relationship that there is an intersection between the ray and the detector; and the image reconstruction is performed by using the three-dimensional helical back-projection method based on the acquired data, and the ray channel angle and the slice number corresponding to each pixel position. In this way, only the ray channel angle and the slice number corresponding to each pixel position need to be calculated, and then the image reconstruction may be implemented by using the actual position mathematical relationship between the ray and the detector and the calculated actual ray channel angle and slice number. Therefore, the artifact, which is caused by the slice number deviation and the view angle deviation of the position of the channel in the row of the detector with respect to the translation axis due to the titled scanning plane, is avoided. Moreover, with the method, there is no need to correct the raw data, therefore, the reliability of the data and the accuracy of the reconstructed image are ensured.

Second Embodiment

In order to describe more clearly the image reconstruction method for tilted helical scan according to the disclosure, the image reconstruction method is described more specifically according to the second embodiment. The method includes the following steps.

Step 201 is, acquiring data generated by the tilted helical scan.

Step 202 is, calculating a ray channel parameter and a slice number corresponding to each pixel position based on a geometric relationship that a ray of the tilted helical scan emitting from a ray source to a detector intersects with a pixel.

Preferably. Step 202 may include:

establishing a ray source parametric mathematical equation, a tilted detector parametric mathematical equation and a target tilted image parametric mathematical equation for a titled scan system;

calculating a ray equation for a ray from the ray source to a certain pixel position by using the target tilted image parametric mathematical equation and the ray source parametric mathematical equation; and solving the ray equation and the titled detector parametric mathematical equation simultaneously for the ray channel parameter and the slice number, based on a structural relationship that there is an intersection between the ray and the detector.

Step 203 is, performing image reconstruction by using the three-dimensional helical back-projection method based on the acquired data, and the ray channel angle and the slice number corresponding to each pixel position.

In the case where the acquired data generated by the tilted helical scan is cone-beam data, the image reconstruction method is as follows.

The three-dimensional back-projection reconstruction method for the cone-beam data may be described by the following equation:

$$f(x, y) = \int_0^V \frac{R^2}{L(x, y, \theta)^2} w(\theta, \gamma(x, y), m(x, y)) \tilde{P}(\theta, \gamma(x, y), m(x, y)) d\theta \quad \text{Equation (1)}$$

where f(x,y) denotes a pixel value of the image at position (x,y); L(x,y,θ) denotes a spatial distance between the pixel and a focal point; R denotes a rotation radius; w(θ,γ(x,y),m(x,y)) denotes a helical weighting such as Parker window helical weighting;

$$\tilde{P}(\theta, \gamma, m) = \left( \cos\gamma \frac{R}{\sqrt{R^2 + m^2}} P(\theta, \gamma, m) \right) \otimes G(\gamma),$$

and $P(\theta,\gamma(x,y),m(x,y))$ denote projection data in the case where a projection angle is $\theta$, a ray channel angle is $\gamma(x,y)$ and the slice number is $m(x,y)$; $\gamma$ denotes the ray channel angle, which represents a radian from the ray to a central channel, where the radian may have a positive or negative value, and the radian has a positive value for the left of the central channel and has a negative value for the right of the central channel; $\theta$ denotes a projection angle; symbol "$\otimes$" denotes convolution about $\gamma$; $G(\gamma)$ denotes a corresponding convolution kernel such as ramp-like convolution kernel, other convolution kernels may also be used and the disclosure is not limited thereto.

The ray channel angle and the slice number are related to the pixel position and are calculated based on coordinates of the pixel and positions of the ray source and the detector in the reconstruction according to the above-mentioned equation. This is because the scan is a tilted scan and is related to a geometric structure. Therefore, the ray channel angle and the slice number may be calculated by establishing a model based on the mathematical geometric structure.

A following ray source helical trajectory parameter equation (2) is established based on a mathematical geometric relationship of the scan:

$$S(\theta) = \begin{cases} x_F = R\sin\theta \\ y_F = R\cos\theta\cos\varphi \\ z_F = \frac{H}{2\pi}\theta + R\cos\theta\sin\varphi \end{cases} \quad \text{Equation (2)}$$

where, $\theta$ denotes a projection angle, and the above equation is obtained under a condition that $\theta$ is 0 degree at an angle of 12 o'clock and the machine rotates clockwise, and for a differently-defined 0 degree angle or a different rotation direction, the calculation method is the same but the equation is different; $\varphi$ denotes a tilted angle of the detector; R denotes a rotation radius; and H denotes an absolute pitch, that is, the physical distance the scan bed moves per revolution.

A following detector parameter equation (3) is established:

$$D(\theta, \gamma, m) = \begin{cases} x_D = R\sin\theta - R_{FD}\sin(\theta - \gamma) \\ y_D = (R\cos\theta - R_{FD}\cos(\theta - \gamma))\cos\varphi - D(m - MidSlice)\sin\varphi \\ z_D = \frac{H}{2\pi}\theta + (R\cos\theta - R_{FD}\cos(\theta - \gamma))\sin\varphi + D(m - MidSlice)\cos\varphi \end{cases} \quad \text{Equation (3)}$$

where $\gamma$ denotes a fan angle of any one of the rays with respect to a central ray; MidSlice denotes a center slice and has a value of $$\frac{M-1}{2},$$

where M is the total number of slices of the two-dimensional detectors.

A following target image parameter equation (4) is established:

assuming that $Z_0$ denotes an imaging position for a target image, P*P denotes an image matrix, and FOV denotes a field of view for imaging, then three-dimensional coordinates of one point (h,v) on the image are as follows:

$$\begin{cases} x_p = (v - Mid) * \Delta p + CenterX \\ y_p = ((Mid - h) * \Delta p + CenterY) * \cos\varphi \\ z_p = ((Mid - h) * \Delta p + CenterY) * \sin\varphi + Z_0 \end{cases} \quad \text{Equation (4)}$$

Scale z is marked on the patient couch in the CT device, that is, each position of the couch corresponds to a scale value. For example, if the length of the patient couch is 3 meters, the positions of the patient couch from the head portion to the end portion correspond to scale values ranging from 0 to 300 centimeters respectively. These scale values are often used to indicate an image established for a certain position of the patient couch. $Z_0$ denotes a certain imaging scale position.

Here, $\theta$ denotes a projection angle; $\varphi$ denotes a tilted angle of the detector; R denotes a rotation radius; H denotes an absolute pitch; $Z_0$ denotes an imaging position for a target image; P*P denotes an image matrix; FOV denotes a field of view for imaging; for any point (h,v) on the image, $$Mid = \frac{P-1}{2},$$

and CenterX and CenterY denote a reconstruction center; and $\Delta p$ denotes width of a single pixel.

A ray equation for a ray from a ray source to a certain pixel position is calculated by using the target image parametric mathematical equation and the ray source parametric mathematical equation. Specifically, a following parametric equation (5) is used to represent a ray which is emitted from the ray source and passes through the pixel:

$$\begin{cases} x = x_F + t(x_p - x_F) \\ y = y_F + t(y_p - y_F) \\ z = z_F + t(z_p - z_F) \end{cases} \quad \text{Equation (5)}$$

where t denotes an intermediate parameter for calculating. Since there is an intersection between the ray and the detector, a following equation (6) is obtained from a simultaneous equation of the ray equation (5) and the detector equation (3):

$$\begin{cases} x_F + t(x_p - x_F) = R\sin\theta - R_{FD}\sin(\theta - \gamma) & a) \\ y_F + t(y_p - y_F) = (R\cos\theta - R_{FD}\cos(\theta - \gamma))\cos\varphi - D(m - MidSlice)\sin\varphi & b) \\ z_F + t(z_p - z_F) = \frac{H}{2\pi}\theta + (R\cos\theta - R_{FD}\cos(\theta - \gamma))\sin\varphi + D(m - MidSlice)\cos\varphi & c) \end{cases}$$

Equation (6)

The ray channel angle, γ, and the slice number, m, are obtained by solving the above equation. The solving processes are as follows.

1, the Solving Process for the Ray Channel Angle γ

The unknown number m is eliminated by equation b)*cos φ+c)*sin φ and the following equation (7) is obtained:

$$t = \frac{(R\cos\theta - R_{FD}\cos(\theta - \gamma)) + \frac{H}{2\pi}\theta\sin\varphi - (y_F\cos\varphi + z_F\sin\varphi)}{((y_p - y_F)\cos\varphi + (z_p - z_F)*\sin\varphi)}$$

Equation (7)

The equation (7) is substituted into equation a) in the equation (6) and a following simple equation (8) about the ray channel angle γ is obtained:

$$B*\cos(\theta-\gamma) - A\sin(\theta-\gamma) = C$$

Equation (8)

where A, B, C respectively denote:

$$A = R_{FD} * ((y_p - y_F)\cos\varphi + (z_p - z_F)*\sin\varphi)$$

$$B = R_{FD}(x_p - x_F)$$

$$C = (x_p - x_F)R\cos\theta + \left(\frac{H}{2\pi}\theta\sin\varphi - (y_F\cos\varphi + z_F\sin\varphi)\right)*(x_p - x_F) +$$

$$x_F * ((y_p - y_F)\cos\varphi + (z_p - z_F)*\sin\varphi) -$$

$$R\sin\theta((y_p - y_F)\cos\varphi + (z_p - z_F)*\sin\varphi)$$

The calculated ray channel angle is $$\gamma = \arcsin\frac{C}{\sqrt{A^2 + B^2}} - \tau + \theta + 2k\pi, \quad \tau = \arcsin\frac{B}{\sqrt{A^2 + B^2}};$$

k is adjusted to realize γ∈(γ$_{min}$,γ$_{max}$).

2, the Solving Process for the Slice Number m

The γ obtained above is substituted into the equation a) to solve for t, and the obtained t is substituted into the equation b) or the equation c) to solve for the slice number m.

$$m = \frac{(R\cos\theta - R_{FD}\cos(\theta - \gamma_0))\cos\varphi - y_F - t_0(y_p - y_F)}{D\sin\varphi} + MidSlice$$

Equation (9)

If sin φ=0, then $$m = \frac{z_F + t(z_p - z_F) - \left(\frac{H}{2\pi}\theta + (R\cos\theta - R_{FD}\cos(\theta - \gamma))\sin\varphi\right)}{D\cos\varphi} + MidSlice$$

Equation (10)

γ$_0$ and t$_0$ in the above equation of m denote respectively γ and t obtained from the above calculation.

γ and m obtained from the above calculation are substituted into the equation (1) and the reconstructed image may be obtained according to the equation.

In the case where the acquired data generated by the tilted helical scan is wedge-beam data, the back-projection image reconstruction method is as follows.

The three-dimensional back-projection reconstruction method for the wedge-beam data may be described by the following equation:

$$f(x, y) = \int_0^V w(\theta, T(x, y), m(x, y))\tilde{P}(\theta, T(x, y), m(x, y))d\theta$$

Equation (11)

where f(x,y) denotes a pixel value; w(θ,γ(x,y),m(x,y)) denotes a helical weighting such as trapezoidal weighting or Aperture helical weighting; R denotes a rotation radius; T denotes a vertical distance between a central channel and a ray projected onto a center plane and may have a positive or negative value; θ denotes a projection angle; and m(x,y) denotes the slice number of the image at position (x,y);

$$\tilde{P}(\theta, \gamma, m) = \left(\cos\gamma\frac{R}{\sqrt{R^2 + m^2}}P(\theta, \gamma, m)\right) \otimes G(\gamma),$$

where R denotes a rotation radius; symbol "⊗" denotes convolution about T; G(T) denotes a corresponding convolution kernel such as ramp-like convolution kernel; and P(θ,γ(x,y), m(x,y)) denotes projection data in the case where a projection angle is θ, a channel distance of a certain ray in the wedge beam is T(x,y) and the slice number is m(x,y).

T(x,y) and m(x,y) are both related to the spatial geometric position of the pixel and are calculated based on coordinates of the pixel and positions of the ray source and the detector in the reconstruction according to the above-mentioned equation. This is because the scan is a tilted scan and is related to a geometric structure. Therefore, the ray channel angle and the slice number may be calculated by establishing a model based on the mathematical geometric structure.

A following ray source helical trajectory parametric equation (12) is established based on a mathematical geometric relationship of the scan:

$$S(\theta, T) = \begin{cases} x_F = R\sin\left(\theta + \arcsin\frac{T}{R}\right) \\ y_F = R\cos\left(\theta + \arcsin\frac{T}{R}\right)\cos\varphi \\ z_F = \frac{H}{2\pi}\left(\theta + \arcsin\frac{T}{R}\right) + R\cos\left(\theta + \arcsin\frac{T}{R}\right)\sin\varphi \end{cases}$$

Equation (12)

The above ray source parametric equation may be simplified as follows:

$$S(\theta, T) =$$

Equation (13)

$$\begin{cases} x_F = \sqrt{R^2 - T^2}\sin\theta + T\cos\theta \\ y_F = \sqrt{R^2 - T^2}\cos\theta\cos\varphi - T\sin\theta\cos\varphi \\ z_F = \frac{H}{2\pi}\left(\theta + \arcsin\frac{T}{R}\right) + \sqrt{R^2 - T^2}\cos\theta\sin\varphi - T\sin\theta\sin\varphi \end{cases}$$

Coordinates of the ray source for different channels in a same wedge-beam data are different.

A following detector parametric equation (14) is established:

$$D(\theta, \gamma, m) = \begin{cases} x_D = R\sin\left(\theta + \arcsin\dfrac{T}{R}\right) - R_{FD}\sin(\theta) \\ y_D = \left(R\cos\left(\theta + \arcsin\dfrac{T}{R}\right) - R_{FD}\cos(\theta)\right)\cos\varphi - D(m - MidSlice)\sin\varphi \\ z_D = \dfrac{H}{2\pi}\left(\theta + \arcsin\dfrac{T}{R}\right) + \left(R\cos\left(\theta + \arcsin\dfrac{T}{R}\right) - R_{FD}\cos(\theta)\right)\sin\varphi + D(m - MidSlice)\cos\varphi \end{cases}$$

Equation (14)

The above detector parametric equation may be simplified as follows:

$$D(\theta, T, m) = \begin{cases} x_D = \sqrt{R^2 - T^2}\sin\theta + T\cos\theta - R_{FD}\sin(\theta) \\ y_D = \left(\sqrt{R^2 - T^2}\cos\theta - T\sin\theta - R_{FD}\cos(\theta)\right)\cos\varphi - D(m - MidSlice)\sin\varphi \\ z_D = \dfrac{H}{2\pi}\left(\theta + \arcsin\dfrac{T}{R}\right) + \left(\sqrt{R^2 - T^2}\cos\theta - T\sin\theta - R_{FD}\cos(\theta)\right)\sin\varphi + D(m - MidSlice)\cos\varphi \end{cases}$$

Equation (15)

Assuming that $Z_0$ denotes an imaging position for a target image, P*P denotes an image matrix, and FOV denotes a field of view for imaging, then three-dimensional coordinates of one point (h,v) on the image are as follows:

$$\begin{cases} x_p = (v - Mid) * \Delta p + CenterX \\ y_p = ((Mid - h) * \Delta p + CenterY) * \cos\varphi \\ z_p = ((Mid - h) * \Delta p + CenterY) * \sin\varphi + Z_0 \end{cases}$$

Equation (16)

In the above equation, θ denotes a projection angle; φ denotes a tilted angle of the detector, R denotes a rotation radius; H denotes an absolute pitch; $Z_0$ denotes an imaging position for a target image; P*P denotes an image matrix; FOV denotes a field of view for imaging; for any point (h,v) on the image, $$Mid = \frac{P-1}{2},$$

and CenterX and CenterY denote a reconstruction center; Δp denotes width of a single pixel; MidSlice denotes a center slice and has a value of $$\frac{M-1}{2},$$

where M is the total number of slices of the two-dimensional detectors; T denotes a vertical distance between a central channel and a ray projected onto a center plane; and m denotes the slice number.

A ray equation for a ray from a ray source to a certain pixel position is calculated by using the target image parameter mathematical equation and the ray source parameter mathematical equation. Specifically, the parametric equation is used to represent a ray which is emitted from the ray source and passes through the pixel:

the following parametric equation (17) is used to represent each ray which starts from the focal point and reaches the detector:

$$\begin{cases} x = x_F + t(x_D - x_F) \\ y = y_F + t(y_D - y_F) \\ z = z_F + t(z_D - z_F) \end{cases}$$

Equation (17)

where t denotes an intermediate parameter for calculating. Since there is an intersection between the ray and the detector, the ray equation and the detector equation are solved simultaneously for the channel distance T and the slice number m as follows.

1, the Solving Process for the Channel Parameter T

There is an intersection between the ray and the pixel, and a following equation is obtained from a simultaneous equation of the above ray parametric equation and the detector parametric equation:

$$\begin{cases} x_F + t(x_D - x_F) = x_p \\ y_F + t(y_D - y_F) = y_p \\ z_F + t(z_D - z_F) = z_p \end{cases}$$

-continued that is, $$\begin{cases} \sqrt{R^2 - T^2}\sin\theta + T\cos\theta - tR_{FD}\sin(\theta) = x_p & a) \\ \sqrt{R^2 - T^2}\cos\theta\cos\varphi - T\sin\theta\cos\varphi + t(-R_{FD}\cos(\theta)\cos\varphi - D(m - MidSlice)\sin\varphi) = y_p & b) \\ \frac{H}{2\pi}\left(\theta + \arcsin\frac{T}{R}\right) + \sqrt{R^2 - T^2}\cos\theta\sin\varphi - T\sin\theta\sin\varphi + t(-R_{FD}\cos(\theta)\sin\varphi + D(m - MidSlice)\cos\varphi) = z_p & c) \end{cases}$$

Equation (18)

c)*sin ϕ+b)*cos ϕ is calculated according to the equation c) and the equation b) of the equation (18) and by substituting t in the equation a), to obtain the following equation:

$$\sqrt{R^2 - T^2}\cos\theta\sin\theta - T\sin^2\theta + \frac{H}{2\pi}\left(\theta + \arcsin\frac{T}{R}\right)\sin\varphi\sin\theta -$$

Equation (19)

$$(x_p - (\sqrt{R^2 - T^2}\sin\theta + T\cos\theta))\cos\theta =$$

$$(y_p\cos\varphi + z_p\sin\varphi)\sin\theta$$

where $\cos\gamma = \frac{\sqrt{R^2 - T^2}}{R}$, and $\sin\gamma = \frac{T}{R}$, Therefore, $$\left(\cos(\gamma + \theta) + \frac{H}{2\pi}(\theta + \gamma)\sin\varphi\right)\sin\theta = \frac{(y_p\cos\varphi + z_p\sin\varphi)\sin\theta + (x_p - x_F)\cos\theta}{R}$$

is obtained;

If θ=0, Equation (20) of T=$x_p$/cos θ may be obtained according to the equation a); and if θ≠0, the equation is a transcendental equation which has no explicit solution and may be solved by using a numerical method such as dichotomy. Since θ is already known, γ+θ∈ (−$\gamma_{max}$+θ, $\gamma_{max}$+θ) is obtained. In this region, γ may be solved for by using the dichotomy, to obtain the channel parameter:

T=R sin γ  Equation (21)

2, the Solving Process for the Slice Number m

After the parameter T is obtained from the solving process for the channel parameter T, T is substituted into the equation a) to solve for t, and then t is substituted into the equation b) to solve for m. The specific process is as follows:

$$\sqrt{R^2 - T^2}\cos\theta - T\sin\theta + t(-R_{FD}\cos\theta) +$$

Equation (22)

$$\frac{H}{2\pi}\left(\theta + \arcsin\frac{T}{R}\right)\sin\varphi = y_p\cos\varphi + z_p\sin\varphi$$

The obtained T is substituted into the equation (22) to solve for t, and then t is substituted into the equation b) to obtain the slice number m.

$$m = \frac{(y_p\sin\theta - x_p\cos(\theta) + T)R_{FD}}{(x_p - \sqrt{R^2 - T^2}\sin\theta - T\cos\theta)D\sin\varphi} + MidSlice$$

Equation (23)

If sin ϕ=0, $$m = \frac{\left(-\frac{H}{2\pi}\left(\theta + \arcsin\frac{T}{R}\right) + z_p\right)R_{FD}\sin(\theta) + (T - x_p\cos(\theta))R_{FD}\sin\varphi}{\sqrt{R^2 - T^2}\sin\theta + T\cos\theta - x_p}$$

Equation (24)

T and m obtained from the above calculation are substituted into the equation (11) and the back-projection image reconstruction may be performed according to the equation.

As can be seen from the embodiment described above, in the image reconstruction method according to the disclosure, the data generated by the tilted helical scan is acquired; the ray parametric equation, the detector parametric equation and the ray source parametric equation may be established based on the mathematical relationship that there is an intersection between the ray and the detector, the ray channel parameter and the slice number corresponding to each pixel position are calculated according to the mathematical geometric relationship among the three parametric equations; and the image reconstruction is performed by using the three-dimensional helical back-projection method based on the acquired data, and the ray channel angle and the slice number corresponding to each pixel position. In this way, only the ray channel parameter and the slice number corresponding to each pixel position need to be calculated, and then the back-projection image reconstruction may be implemented by using the actual position mathematical relationship between the ray and the detector and the calculated actual ray channel parameter and slice number. Therefore, the artifact, which is caused by the channel and slice deviation view by view due to the tilted scanning plane, is avoided. Moreover, with the method, there is no need to correct the raw data, therefore, the reliability of the data and the accuracy of the back-projection reconstructed image are ensured.

Third Embodiment

Figure 2:
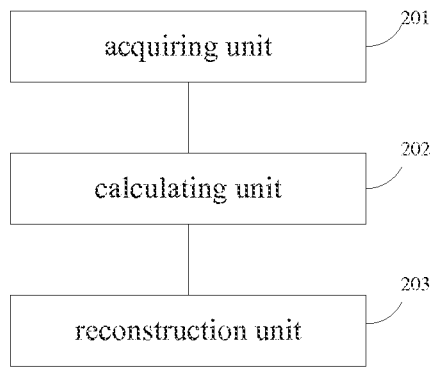
FIG. 2 is a structural diagram of an image reconstruction device for tilted helical scan according to a second embodiment of the disclosure.

Corresponding to the image reconstruction method for tilted helical scan according to the above-mentioned first embodiment, an image reconstruction device for tilted helical scan is further provided by the embodiment of the disclosure. Reference is made to FIG. 2 which is a structural diagram of an image reconstruction device for tilted helical scan according to the third embodiment of the disclosure. The device includes an acquiring unit 201, a calculating unit 202 and a reconstruction unit 203. The internal structures and the connection thereof in the device are further described below in conjunction with the working principle of the device.

The acquiring unit 201 is adapted to acquire data generated by the tilted helical scan.

The calculating unit 202 is adapted to calculate a ray channel parameter and a slice number corresponding to each pixel position based on a geometric relationship that a ray of the tilted helical scan emitting from a ray source to a detector intersects with a pixel.

The reconstruction unit 203 is adapted to perform image reconstruction by using a three-dimensional helical back-projection method based on the acquired data, and the ray channel parameter and the slice number corresponding to each pixel position.

Preferably, the calculating unit may include:

an establishing module, adapted to establish a ray source parametric mathematical equation, a tilted detector parametric mathematical equation and a target tilted image parametric mathematical equation for a scan system;

a calculating module, adapted to calculate a ray equation for a ray from the ray source to a certain pixel position by using the target tilted image parametric mathematical equation and the ray source parametric mathematical equation; and a solving module, adapted to solve the ray equation and the tilted detector parametric mathematical equation simultaneously for the ray channel parameter and the slice number, based on a geometric relationship that there is an intersection between the ray and the detector.

Preferably, the data generated by the tilted helical scan acquired by the acquiring unit is cone-beam data or wedge-beam data.

Preferably, ramp-like convolution kernel is used in the three-dimensional helical back-projection method by the reconstruction unit.

Preferably, different helical weighting is used in the three-dimensional helical back-projection method by the reconstruction unit according to different type of the data obtained by the acquiring unit.

For the cone-beam data and the wedge-beam data, different mathematical equations are used in the back-projection reconstruction method. The ray channel angle $\gamma$ and the slice number m need to be obtained in the back-projection reconstruction method for the cone-beam data. The ray channel parameter T and the slice number m need to be obtained in the back-projection reconstruction method for the wedge-beam data.

Preferably, in the case where the data generated by the tilted helical scan acquired by the acquiring unit is the cone-beam data, the calculating unit may include:

a first establishing module, adapted to, based on a geometric relationship of the tilted helical scan, establish a following ray source helical trajectory parametric equation:

$$S(\theta) = \begin{cases} x_F = R\sin\theta \\ y_F = R\cos\theta\cos\varphi \\ z_F = \dfrac{H}{2\pi}\theta + R\cos\theta\sin\varphi \end{cases},$$

establish a following tilted detector parametric equation:

$D(\theta, \gamma, m) =$ $$\begin{cases} x_D = R\sin\theta - R_{FD}\sin(\theta - \gamma) \\ y_D = (R\cos\theta - R_{FD}\cos(\theta - \gamma))\cos\varphi - D(m - MidSlice)\sin\varphi \\ z_D = \dfrac{H}{2\pi}\theta + (R\cos\theta - R_{FD}\cos(\theta - \gamma))\sin\varphi + D(m - MidSlice)\cos\varphi \end{cases},$$

establish a following target image parametric equation:

$$\begin{cases} x_p = (v - Mid) * \Delta p + CenterX \\ y_p = ((Mid - h) * \Delta p + CenterY) * \cos\varphi \\ z_p = ((Mid - h) * \Delta p + CenterY) * \sin\varphi + Z_0 \end{cases},$$

where $\theta$ denotes a projection angle; $\varphi$ denotes a tilted angle of the detector; R denotes a rotation radius; H denotes an absolute pitch; $Z_0$ denotes an imaging position for a target image; P*P denotes an image matrix; FOV denotes a field of view for imaging; for a point (h,v) on an image, $$Mid = \dfrac{P-1}{2},$$

and CenterX and CenterY denote a reconstruction center; $\Delta p$ denotes width of a single pixel; MidSlice denotes a center slice and has a value of $$\dfrac{M-1}{2},$$

where M is the total number of slices of the two-dimensional detectors; $\gamma$ denotes a channel angle; and m denotes the slice number; and establish a following ray equation for a ray from the ray source to a certain pixel position by using the target image parametric equation and the ray source helical trajectory parametric equation:

$$\begin{cases} x = x_F + t(x_p - x_F) \\ y = y_F + t(y_p - y_F) \\ z = z_F + t(z_p - z_F) \end{cases},$$

where t denotes an intermediate parameter for calculating; and a first solving module, adapted to solve the ray equation and the tilted detector parametric equation for the channel angle, $\gamma$, and the slice number, m, based on a geometric relationship that there is an intersection between the ray equation and the tilted detector parametric equation.

Preferably, in the case where the data generated by the tilted helical scan acquired by the acquiring unit is wedge-beam data, the calculating unit may include:

a second establishing module, adapted to, based on a geometric relationship of the tilted helical scan, establish a following ray source helical trajectory parametric equation:

$$S(\theta, T) = \begin{cases} x_F = R\sin\left(\theta + \arcsin\dfrac{T}{R}\right) \\ y_F = R\cos\left(\theta + \arcsin\dfrac{T}{R}\right)\cos\varphi \\ z_F = \dfrac{H}{2\pi}\left(\theta + \arcsin\dfrac{T}{R}\right) + R\cos\left(\theta + \arcsin\dfrac{T}{R}\right)\sin\varphi \end{cases},$$

establish a following tilted detector parametric equation:

$$D(\theta, \gamma, m) = \begin{cases} x_D = R\sin\left(\theta + \arcsin\frac{T}{R}\right) - R_{FD}\sin(\theta) \\ y_D = \left(R\cos\left(\theta + \arcsin\frac{T}{R}\right) - R_{FD}\cos(\theta)\right)\cos\varphi - D(m - MidSlice)\sin\varphi \\ z_D = \frac{H}{2\pi}\left(\theta + \arcsin\frac{T}{R}\right) + \left(R\cos\left(\theta + \arcsin\frac{T}{R}\right) - R_{FD}\cos(\theta)\right)\sin\varphi + D(m - MidSlice)\cos\varphi \end{cases},$$

establish a following target image parametric equation:

$$\begin{cases} x_P = (v - Mid) * \Delta p + CenterX \\ y_P = ((Mid - h) * \Delta p + CenterY) * \cos\varphi \\ z_P = ((Mid - h) * \Delta p + CenterY) * \sin\varphi + Z_0 \end{cases},$$

where, θ denotes a projection angle; φ denotes a tilted angle of the detector; R denotes a rotation radius; H denotes an absolute pitch; $Z_0$ denotes an imaging position for a target image; P*P denotes an image matrix; FOV denotes a field of view for imaging; for a point (h,v) on the image, $$Mid = \frac{P-1}{2},$$

and CenterX and CenterY denote a reconstruction center; Δp denotes width of a single pixel; MidSlice denotes a center slice and has a value of $$\frac{M-1}{2},$$

where M is the total number of slices of the two-dimensional detectors; T denotes a vertical distance between a central channel and a ray projected onto a center plane; and m denotes the slice number; and establish a following ray equation for a ray from a ray source to a certain pixel position by using the target image parametric equation and the ray source helical trajectory parametric equation:

$$\begin{cases} x = x_F + t(x_D - x_F) \\ y = y_F + t(y_D - y_F) \\ z = z_F + t(z_D - z_F) \end{cases}$$

and a second solving module, adapted to solve the ray equation and the tilted detector parametric equation for the channel distance, T, and the slice number, m, based on a geometric relationship that there is an intersection between the ray equation and the tilted detector parametric equation.

As can be seen from the third embodiment described above, in the image reconstruction device according to the disclosure, the data generated by the tilted helical scan is acquired; the ray channel angle and the slice number corresponding to each pixel position are calculated based on the mathematical relationship that there is an intersection between the ray and the detector; and the image reconstruction is performed by using the three-dimensional helical back-projection method based on the acquired data, and the ray channel parameter and the slice number corresponding to each pixel position. In this way, only the ray channel angle or the channel distance and the slice number corresponding to each pixel position need to be calculated, and then the image reconstruction may be implemented by using the actual position mathematical relationship between the ray and the detector and the calculated actual ray channel angle or channel distance and slice number. Therefore, the artifact, which is caused by the slice number deviation and the view angle deviation of the position of the channel in the row of the detector with respect to the translation axis due to the tilted scanning plane, is avoided. Moreover, with the device, there is no need to correct the raw data, therefore, the reliability of the data and the accuracy of the reconstructed image are ensured.

It should be noted that each of the modules (units) in the above-mentioned device of the disclosure may be integrated into a CT device or may be arranged independently.

It should be noted that, in the present disclosure, relational terms such as "first" and "second" are used only to distinguish one entity or operation from another entity or operation, but do not necessarily demand or imply that there is actual relation or order among these entities or operations. In addition, the terms "including", "comprising", or any other variations thereof indicate a non-exclusive inclusion, and the process, method, article or device that includes a series of elements includes not only these elements but also other elements that are not explicitly listed, or further includes elements inherent in the process, method, article or device. Moreover, when there is no further limitation, the element defined by the statement "comprise(s) a . . . " does not exclude the case that the process, method, article or device that includes the element also includes other same elements.

In addition, it should be understood by those skilled in the art that part or all of the process in the above-mentioned method embodiment may be implemented by related hardware instructed by computer programs. The program may be stored in a computer readable storage medium. When being executed, the program may achieve the processes of the above-mentioned method embodiment. The storage medium may be, for example, a magnetic disk, an optical disk, a read-only memory (ROM) or a random access memory (RAM).

The image reconstruction method and device for the tilted helical scan according to the disclosure are described as above. The principles and the embodiments of the disclosure are described herein by using specific examples, which are only for facilitating the understanding of the method and the core concept of the disclosure. Moreover, modifications may be made to the embodiments and the application scopes by those skilled in the art based on the concept of the disclosure. In view of the above, the contents in the disclosure should not be understood as limiting the present invention.

The invention claimed is:

1. An image reconstruction method for tilted helical scan, comprising:
   acquiring data generated by the tilted helical scan;
   calculating a ray channel parameter and a slice number corresponding to each pixel position based on a geometric relationship that a ray of the tilted helical scan emitting from a ray source to a detector intersects with a pixel; and performing image reconstruction by using a three-dimensional helical back-projection method based on the acquired data, and the ray channel parameter and the slice number corresponding to each pixel position.

2. The method according to claim 1, wherein the calculating a ray channel parameter and a slice number corresponding to each pixel position based on a geometric relationship that a ray of the tilted helical scan emitting from a ray source to a detector intersects with a pixel comprises:

establishing a ray source parametric mathematical equation, a tilted detector parametric mathematical equation and a target tilted image parametric mathematical equation for a tilted scan system;

calculating a ray equation for a ray from the ray source to a certain pixel position by using the target tilted image parametric mathematical equation and the ray source parametric mathematical equation; and solving the ray equation and the tilted detector parametric mathematical equation simultaneously for the ray channel parameter and the slice number, based on a geometric relationship that there is an intersection between the ray and the detector.

3. The method according to claim 1, wherein the acquired data generated by the tilted helical scan is cone-beam data or wedge-beam data.

4. The method according to claim 1, wherein in the case where the acquired data generated by the tilted helical scan is cone-beam data, the calculating a ray channel parameter and a slice number corresponding to each pixel position based on a geometric relationship that a ray of the tilted helical scan emitting from a ray source to a detector intersects with a pixel comprises:

based on a geometric relationship of the tilted helical scan, establishing a following ray source helical trajectory parametric equation:

$$S(\theta) = \begin{cases} x_F = R\sin\theta \\ y_F = R\cos\theta\cos\varphi \\ z_F = \dfrac{H}{2\pi}\theta + R\cos\theta\sin\varphi \end{cases},$$

establishing a following tilted detector parametric equation:

$D(\theta, \gamma, m) =$ $$\begin{cases} x_D = R\sin\theta - R_{FD}\sin(\theta - \gamma) \\ y_D = (R\cos\theta - R_{FD}\cos(\theta - \gamma))\cos\varphi - D(m - MidSlice)\sin\varphi \\ z_D = \dfrac{H}{2\pi}\theta + (R\cos\theta - R_{FD}\cos(\theta - \gamma))\sin\varphi + D(m - MidSlice)\cos\varphi \end{cases},$$

establishing a following target tilted image parametric equation (for a point (h,v) on an image):

$$\begin{cases} x_p = (v - Mid) * \Delta p + CenterX \\ y_p = ((Mid - h) * \Delta p + CenterY) * \cos\varphi \\ z_p = ((Mid - h) * \Delta p + CenterY) * \sin\varphi + Z_0 \end{cases},$$

wherein $\theta$ denotes a projection angle; $\phi$ denotes a tilted angle of the detector; R denotes a rotation radius; H denotes an absolute pitch; $Z_0$ denotes an imaging position for a target image; P*P denotes an image matrix; FOV denotes a field of view for imaging; for the point (h,v) on the image, $$Mid = \dfrac{P-1}{2},$$

and CenterX and CenterY denote a reconstruction center; $\Delta p$ denotes width of a single pixel; MidSlice denotes a center slice and has a value of $$\dfrac{M-1}{2},$$

wherein M is the total number of slices of two-dimensional detectors; $\gamma$ denotes a channel angle; and m denotes the slice number;

establishing a following ray equation for a ray from the ray source to a certain pixel position by using the target tilted image parametric equation and the ray source helical trajectory parametric equation:

$$\begin{cases} x = x_F + t(x_p - x_F) \\ y = y_F + t(y_p - y_F) \\ z = z_F + t(z_p - z_F) \end{cases}$$

wherein t denotes an intermediate parameter for calculating; and solving the ray equation and the tilted detector parametric equation for the channel angle, $\gamma$, and the slice number, m, based on a geometric relationship that there is an intersection between the ray equation and the tilted detector parametric equation.

5. The method according to claim 1, wherein in the case where the acquired data generated by the tilted helical scan is wedge-beam data, the calculating a ray channel parameter and a slice number corresponding to each pixel position based on a geometric relationship that a ray of the tilted helical scan emitting from a ray source to a detector intersects with a pixel comprises:

based on a geometric relationship of the tilted helical scan, establishing a following ray source helical trajectory parametric equation:

$$S(\theta, T) = \begin{cases} x_F = R\sin\left(\theta + \arcsin\dfrac{T}{R}\right) \\ y_F = R\cos\left(\theta + \arcsin\dfrac{T}{R}\right)\cos\varphi \\ z_F = \dfrac{H}{2\pi}\left(\theta + \arcsin\dfrac{T}{R}\right) + R\cos\left(\theta + \arcsin\dfrac{T}{R}\right)\sin\varphi \end{cases},$$

establishing a following tilted detector parametric equation:

$$D(\theta, \gamma, m) = \begin{cases} x_D = R\sin\left(\theta + \arcsin\frac{T}{R}\right) - R_{FD}\sin(\theta) \\ y_D = \left(R\cos\left(\theta + \arcsin\frac{T}{R}\right) - R_{FD}\cos(\theta)\right)\cos\varphi - D(m - MidSlice)\sin\varphi \\ z_D = \frac{H}{2\pi}\left(\theta + \arcsin\frac{T}{R}\right) + \left(R\cos\left(\theta + \arcsin\frac{T}{R}\right) - R_{FD}\cos(\theta)\right)\sin\varphi + D(m - MidSlice)\cos\varphi \end{cases},$$

establishing a following target image parametric equation:

$$\begin{cases} x_p = (v - Mid) * \Delta p + CenterX \\ y_p = ((Mid - h) * \Delta p + CenterY) * \cos\varphi \\ z_p = ((Mid - h) * \Delta p + CenterY) * \sin\varphi + Z_0 \end{cases},$$

wherein $\theta$ denotes a projection angle; $\phi$ denotes a tilted angle of the detector; R denotes a rotation radius; H denotes an absolute pitch; $Z_0$ denotes an imaging position for a target image; P*P denotes an image matrix; FOV denotes a field of view for imaging; for a point (h,v) on an image, $$Mid = \frac{P-1}{2},$$

and CenterX and CenterY denote a reconstruction center; $\Delta p$ denotes width of a single pixel; MidSlice denotes a center slice and has a value of $$\frac{M-1}{2},$$

wherein M is the total number of slices of two-dimensional detectors; T denotes a vertical distance between a central channel and a ray projected onto a center plane; and m denotes the slice number, establishing a following ray equation for a ray from the ray source to a certain pixel position by using the target image parametric equation and the ray source helical trajectory parametric equation:

$$\begin{cases} x = x_F + t(x_D - x_F) \\ y = y_F + t(y_D - y_F) \\ z = z_F + t(z_D - z_F) \end{cases};$$

and solving the ray equation and the tilted detector parametric equation for the channel distance, T, and the slice number, m, based on a geometric relationship that there is an intersection between the ray equation and the tilted detector parametric equation.

6. An image reconstruction device for tilted helical scan, comprising a hardware processor and a memory having processor-executable instructions stored therein, and the instructions when executed by the hardware processor, configure the device to:

acquire data generated by the tilted helical scan;

calculate a ray channel parameter and a slice number corresponding to each pixel position based on a geometric relationship that a ray of the tilted helical scan emitting from a ray source to a detector intersects with a pixel; and perform image reconstruction by using a three-dimensional helical back-projection method based on the acquired data, and the ray channel parameter and the slice number corresponding to each pixel position.

7. The device according to claim 6, wherein the device is further configured to:

establish a ray source parameter mathematical equation, a tilted detector parameter mathematical equation and a target tilted image parameter mathematical equation for a scan system;

calculate a ray equation for a ray from the ray source to a certain pixel position by using the target tilted image parameter mathematical equation and the ray source parameter mathematical equation; and solve the ray equation and the tilted detector parameter mathematical equation simultaneously for the ray channel parameter and the slice number, based on a geometric relationship that there is an intersection between the ray and the detector.

8. The device according to claim 6, wherein the data generated by the tilted helical scan is cone-beam data or wedge-beam data.

9. The device according to claim 6, wherein in the case where the data generated by the tilted helical scan is cone-beam data, the device is further configured to:

based on a geometric relationship of the tilted helical scan, establish a following ray source helical trajectory parametric equation:

$$S(\theta) = \begin{cases} x_F = R\sin\theta \\ y_F = R\cos\theta\cos\varphi \\ z_F = \frac{H}{2\pi}\theta + R\cos\theta\sin\varphi \end{cases},$$

establish a following tilted detector parametric equation:

$$D(\theta, \gamma, m) = \begin{cases} x_D = R\sin\theta - R_{FD}\sin(\theta - \gamma) \\ y_D = (R\cos\theta - R_{FD}\cos(\theta - \gamma))\cos\varphi - D(m - MidSlice)\sin\varphi \\ z_D = \dfrac{H}{2\pi}\theta + (R\cos\theta - R_{FD}\cos(\theta - \gamma))\sin\varphi + D(m - MidSlice)\cos\varphi \end{cases},$$

establish a following target image parametric equation:

$$\begin{cases} x_p = (v - Mid)*\Delta p + CenterX \\ y_p = ((Mid - h)*\Delta p + CenterY)*\cos\varphi \\ z_p = ((Mid - h)*\Delta p + CenterY)*\sin\varphi + Z_0 \end{cases},$$

wherein θ denotes a projection angle; φ denotes a tilted angle of the detector; R denotes a rotation radius; H denotes an absolute pitch; $Z_0$ denotes an imaging position for a target image; P*P denotes an image matrix; FOV denotes a field of view for imaging; for a point (h,v) on an image, $$Mid = \frac{P-1}{2},$$

and CenterX and CenterY denote a reconstruction center; Δp denotes width of a single pixel; MidSlice denotes a center slice and has a value of $$\frac{M-1}{2},$$

wherein M is the total number of slices of two-dimensional detectors; γ denotes a channel angle; and m denotes the slice number; and establish a following ray equation for a ray from the ray source to a certain pixel position by using the target image parametric equation and the ray source helical trajectory parametric equation:

$$\begin{cases} x = x_F + t(x_p - x_F) \\ y = y_F + t(y_p - y_F) \\ z = z_F + t(z_p - z_F) \end{cases},$$

wherein t denotes an intermediate parameter for calculating; and solve the ray equation and the tilted detector parametric equation for the channel angle, γ, and the slice number, m, based on a geometric relationship that there is an intersection between the ray equation and the tilted detector parametric equation.

10. The device according to claim 6, wherein in the case where the data generated by the tilted helical scan is wedge-beam data, the device is further configured to:

based on a geometric relationship of the tilted helical scan, establish a following ray source helical trajectory parametric equation:

$$S(\theta, T) = \begin{cases} x_F = R\sin\left(\theta + \arcsin\dfrac{T}{R}\right) \\ y_F = R\cos\left(\theta + \arcsin\dfrac{T}{R}\right)\cos\varphi \\ z_F = \dfrac{H}{2\pi}\left(\theta + \arcsin\dfrac{T}{R}\right) + R\cos\left(\theta + \arcsin\dfrac{T}{R}\right)\sin\varphi \end{cases},$$

establish a following tilted detector parametric equation:

$$D(\theta, \gamma, m) = \begin{cases} x_D = R\sin\left(\theta + \arcsin\dfrac{T}{R}\right) - R_{FD}\sin(\theta) \\ y_D = \left(R\cos\left(\theta + \arcsin\dfrac{T}{R}\right) - R_{FD}\cos(\theta)\right)\cos\varphi - D(m - MidSlice)\sin\varphi \\ z_D = \dfrac{H}{2\pi}\left(\theta + \arcsin\dfrac{T}{R}\right) + \left(R\cos\left(\theta + \arcsin\dfrac{T}{R}\right) - R_{FD}\cos(\theta)\right)\sin\varphi + D(m - MidSlice)\cos\varphi \end{cases},$$

establish a following target image parametric equation:

$$\begin{cases} x_p = (v - Mid)*\Delta p + CenterX \\ y_p = ((Mid - h)*\Delta p + CenterY)*\cos\varphi \\ z_p = ((Mid - h)*\Delta p + CenterY)*\sin\varphi + Z_0 \end{cases},$$

wherein, θ denotes a projection angle; φ denotes a tilted angle of the detector; R denotes a rotation radius; H denotes an absolute pitch; $Z_0$ denotes an imaging position for a target image; P*P denotes an image matrix; FOV denotes a field of view for imaging; for a point (h,v) on an image, $$Mid = \frac{P-1}{2},$$

and CenterX and CenterY denote a reconstruction center; Δp denotes width of a single pixel; MidSlice denotes a center slice and has a value of $$\frac{M-1}{2},$$

wherein M is the total number of slices of two-dimensional detectors; T denotes a vertical distance between a central channel and a ray projected onto a center plane; and m denotes the slice number; and establish a following ray equation for a ray from the ray source to a certain pixel position by using the target image parametric equation and the ray source helical trajectory parametric equation:

$$\begin{cases} x = x_F + t(x_D - x_F) \\ y = y_F + t(y_D - y_F) \\ z = z_F + t(z_D - z_F) \end{cases};$$

and
solve the ray equation and the tilted detector parametric equation for the channel distance, T, and the slice number, m, based on a geometric relationship that there is an intersection between the ray equation and the tilted detector parametric equation.

* * * * *